United States Patent [19]

Stastny et al.

[11] 3,950,471

[45] Apr. 13, 1976

[54] MANUFACTURE OF MOLDED ARTICLES OF PARTICULATE FOAMED ETHYLENE COPOLYMERS

[75] Inventors: Fritz Stastny, Ludwigshafen; Hans Georg Trieschmann, Hambach; Rudolf Gaeth, Limburgerhof; Udo Haardt, Ludwigshafen, all of Germany

[73] Assignee: Badische Anilin- & Soda-Fabrik Aktiengesellschaft, Ludwigshafen (Rhine), Germany

[22] Filed: May 2, 1974

[21] Appl. No.: 466,295

Related U.S. Application Data

[63] Continuation of Ser. No. 248,430, April 28, 1972, abandoned.

[30] Foreign Application Priority Data

May 7, 1971 Germany............................ 2122665

[52] U.S. Cl........... 264/122; 260/2.5 B; 260/859 R; 264/51; 264/112; 264/DIG. 7; 264/DIG. 18; 428/306; 428/327
[51] Int. Cl.².................. B29C 27/10; B29D 27/00
[58] Field of Search ........ 264/DIG. 7, 51, 122, 112, 264/DIG. 18; 161/190; 260/2.5 AK, 2.5 B, 878 R, 859; 428/306, 327

[56] References Cited

UNITED STATES PATENTS

| | | | |
|---|---|---|---|
| 3,401,128 | 9/1968 | Terry............................. | 264/DIG. 7 |
| 3,608,031 | 9/1971 | Stastny et al. ................. | 264/DIG. 7 |
| 3,632,673 | 1/1972 | Heilman..................... | 260/878 R X |
| 3,676,190 | 7/1971 | Landler et al............. | 260/878 R X |
| 3,691,265 | 9/1972 | Cobbledick..................... | 160/190 X |
| 3,821,056 | 6/1974 | Reardon......................... | 160/190 X |
| 3,832,423 | 8/1974 | Milkovich et al.............. | 260/878 R |
| 3,840,628 | 10/1974 | Stastny et al................. | 161/190 X |

*Primary Examiner*—Philip Anderson
*Attorney, Agent, or Firm*—Johnston, Keil, Thompson & Shurtleff

[57] ABSTRACT

Manufacture of molded articles of foamed ethylene copolymers containing, attached to the polymer chain, substituents having Zerewitinoff-active hydrogen atoms, and a binder mix containing isocyanate groups, wherein the components are mixed and the mixture is compressed in molds to from 80 to 20% of its original bulk volume and is cured under pressure.

4 Claims, No Drawings

MANUFACTURE OF MOLDED ARTICLES OF PARTICULATE FOAMED ETHYLENE COPOLYMERS

This is a continuation of application Ser. No. 248,430, filed Apr. 28, 1972, and now abandoned.

This invention relates to a process for the manufacture of molded articles of foamed ethylene copolymers in which substituents having Zerewitinoff-active hydrogen atoms are attached to the polymer chain, and a binder mix containing isocyanate groups, wherein the components are mixed, compressed in molds and cured under pressure.

It is well known that molded articles may be made from foamed thermoplastics by mixing particulate foamed compositions of the plastics with binders and causing the mixtures to cure. For example, molded articles have been made from particulate foamed styrene polymers by combining the particles with epoxide or polyester resins. Panels made by this process are hard and break when subjected to bending stresses.

It is also known to make molded articles from foamed olefin homopolymers or copolymers and solvent-free curable binders by compressing the mixtures to from 90 to 30% of their original bulk volume and curing them under pressure. Articles made by this method have satisfactory all-round mechanical properties for practical purposes. However, if the molded materials are thin, they tend to break or crumble when subjected to high bending stresses. However, in specific applications such as domestic floor insulation, mass of closed-cell, particulate plastics capable of withstanding high bending stresses are required.

It is an object of the present invention to provide a process for making molded articles from foamed olefin polymers and binders which are capable of withstanding high bending and folding stresses.

We have found that molded articles having these advantageous properties may be obtained from A. a binder mix containing isocyanate groups and
B. particulate foamed ethylene copolymers by mixing components A and B and compressing and curing the resulting reaction mixture, provided that the foamed ethylene copolymers contain, attached to the polymer chain, substituents having Zerewitinoff-active hydrogen atoms.

In molded articles made in this manner the strength of the bond between the binder and the foamed ethylene copolymer particles is so great that even panels having a thickness of only 1 to 5 mm are resistant to high bending stresses and, in tensile strength tests, the molded articles nearly always yield within the foamed ethylene copolymer particles.

By ethylene copolymers for use in the present invention we mean copolymers which conveniently contain approximately 50% by weight and preferably from 70 to 90% by weight of polymerized units of ethylene in addition to polymerized units of other olefinically unsaturated monomers which contain, in the molecule, substituents having Zerewitinoff-active hydrogen atoms. As examples of suitable substituents having Zerewitinoff-active hydrogen atoms there may be mentioned the following residues: $-SO_3H$, $-SO_2NH_2$, $-NHCOOR$, wherein R is an unsubstituted or substituted alkyl radical of from 1 to 6 carbon atoms, $-NH-CO-NH_2$, $-NH-CO-NH-$, $-CO-NH-CO-$, $-CO-NH-SO_2-$ and, preferably, $-NH_2$, $-OH$ and $-COOH$. Such residues react with the OCN-groups of the binder mix to form ethylene copolymer/binder adducts having urea, urethane, acid amide, biuret and allophanate structures. This gives rise to extremely strong bonds between the foamed ethylene copolymers and the isocyanate group-containing binder mix.

Suitable copolymers are those of ethylene and olefinically unsaturated monomers such as acrylamide, methacrylamide, N-t-butylacrylamide, maleimide, 2-hydroxyethylvinyl sulfide, 3-methyl-3-buten-1-ol, vinylsulfonic acid and, preferably, acrylic acid, methacrylic acid, esters of acrylic and methacrylic acids containing from 1 to 6 carbon atoms and preferably from 1 to 4 carbon atoms, such as methyl acrylate and t-butyl acrylate, and vinyl acetate. The ethylene/acrylate, ethylene/methacrylate and ethylene/vinyl acetate copolymers are partially saponified in order to incorporate groups having Zerewitinoff-active hydrogen atoms. The comonomers may be used alone or in admixture with each other.

We prefer to use ethylene copolymers such as ethylene/t-butyl acrylate copolymers having an ethylene content of from 50 to 95% by weight and preferably from 70 to 85% by weight based on the total weight of the copolymer, in which from 10 to 50% of the carbo-t-butoxy groups have been saponified after polymerization to form carboxyl groups; ethylene/vinyl acetate copolymers having an ethylene content of from 50 to 99% by weight and preferably from 60 to 80% by weight based on the total weight of the copolymer, in which up to 100% and preferably from 75 to 85% of the vinyl acetate units have been saponified to vinyl alcohol; ethylene/acrylic acid copolymers having an ethylene content of from 50 to 99% by weight and preferably from 85 to 95% by weight based on the total weight of the copolymer; ethylene/hydroxypropyl acrylate copolymers having an ethylene content of from 80 to 95% by weight based on the total weight of the copolymer; ethylene/3-methyl-3-buten-1-ol copolymers having an ethylene content of from 90 to 99% by weight based on the total weight of the copolymer; ethylene/acrylamide, ethylene/methacrylamide and ethylene/N-t-butylacrylamide copolymers having an ethylene content of from 50 to 99% by weight based on the total weight of the copolymer.

The ethylene copolymers are used in the form of foamed particles having diameters between 3 and 50 mm and preferably between 5 and 20 mm. By foamed particles we mean particles of foamed material in which the cell walls consist of the olefin polymer. It is preferred, in the present process, to use particles having predominantly closed cells. The foamed particles are obtained by conventional techniques, for example by mixing the olefin polymers with an expanding agent in an extruder and extruding the mixtures through a die and breaking up the resulting expandable extrudate as it leaves the die and before foaming commences. Alternatively, foamed particles may be used which have been prepared by heating mixtures of olefin polymers with expanding agents which decompose on heating to form gaseous products. Particularly suitable are foamed particles having bulk densities between 5 and 200 and preferably between 10 and 60 g/l.

The ethylene copolymers may also be foamed polymer particles which have been subjected to crosslinking by irradiation. Irradiation may be carried out by means of electron accelerating apparatus or X-ray or cobalt-ray apparatus. In order to increase the thermal stability of the ethylene copolymers or molded articles by from about 5° to 30°C, it is advantageous to use particles of olefin polymers containing crosslinked portions, i.e. in which some of the molecules are present in the crosslinked state. Particularly suitable are copolymer particles having a gel content of from 5 to 75% and preferably from 50 to 65% by weight.

The particulate foamed ethylene copolymers are mixed with conventional isocyanate group-containing binder mixes of polyisocyanates, polyols, catalysts and, optionally, auxiliaries such as stabilizers, plasticizers, dyes, fillers and flame retardants.

The starting materials used for the manufacture of the isocyanate group-containing binder mix are conveniently aliphatic and/or preferably aromatic di- and/or poly-isocyanates, such as hexamethylene diisocyanate, diphenylmethane-4,4'-, -2,4'- or -2,2'-diisocyanate, naphthalene-1,5-diisocyanate, benzene-1,4-diisocyanate, triphenylmethane-4,4',4''-triisocyanate, polyphenylpolymethylenepolyisocyanates, toluylene-2,4,6-triisocyanate and, preferably, toluene-2,4- or -2,6-diisocyanate and the known addition products obtained from 1 mole of trimethanolpropane and 3 moles of toluene diisocyanate.

The polyols used are polyetherols and/or polyesterols which may be unbranched, branched-chain or partially branched. Suitable polyetherols, for example, are those which have been prepared by the polyalkoxylation of dihydric or polyhydric and preferably di- and/or trihydric alcohols, such as ethylene glycol, propylene glycol, trimethylol propane, and glycerol with ethylene oxide and/or propylene oxide. Mixtures of different polyalkylene oxides such as those prepared from alcohol mixtures by the addition of ethylene oxide and/or propylene oxide may also be used.

The polyesterols are condensed in the usual manner from aliphatic and/or aromatic dicarboxylic acids such as phthalic acid, terephthalic acid and, preferably, adipic acid, sebacic acid, glutaric acid and succinic acid, and di- and/or tri-hydric alcohols such as glycol, ethylene glycol, butanediol, hexanediol, glycerol and trimethylol propane at elevated temperatures and optionally in the presence of catalysts such as titanium salts or alcoholates.

Suitable polyols have molecular weights ranging from 300 to 5,000, in particular from 1,200 to 3,500 and preferably from 1,800 to 3,200 and have hydroxy numbers of from 30 to 85 and preferably from 50 to 75. The polyisocyanates and polyols are used in such proportions that there are from 1.01 to 1.1 and preferably from 1.02 to 1.05 equivalents of isocyanate groups in the di- and/or polyisocyanates per equivalent of hydroxy groups in the polyols. In this way, binder mixes are obtained which still contain free isocyanate groups.

Suitable catalysts are, for example, tin salts such as dibutyl tin dilaurate and tin(II) octoate and tertiary amines such as 1,3-dimethylimidazole, diethylene triamine, N-2-dimethylaminoethyl-N-methylethanolamine and triethylene diamine.

The amount of isocyanate group-containing binder mix required for the present process is governed by the particle size of the foamed ethylene copolymers and by their shape and surface properties. In general, quantities of from 2 to 50 g and preferably from 5 to 15 g of binder mix per liter of foamed ethylene copolymer particles are adequate. Larger quantities of binder mix may be used, if desired, without detriment to the all-round properties of the molded articles produced by the process of the invention.

The mixtures of particulate foamed ethylene copolymers containing, attached to the polymer chain, substituents having Zerewitinoff-active hydrogen atoms and isocyanate group-containing binder mixes may contain further additives such as fillers, flame retardants and dyes.

Specifically, the molded articles are conveniently made as follows. The foamed ethylene copolymers and the isocyanate group-containing binder mix are thoroughly mixed in a high-speed mixer for about 3 to 10 minutes and then charged into molds. The reaction mixtures are then compressed to from about 80 to 20% and preferably to about 70 to 30% of their original bulk volume. Depending on the pressure applied, the molded articles obtained consist of bonded particles between which some cavities may still be present or which form a homogeneous molded article.

Compression of the reaction mixture of foamed ethylene copolymer particles and binder mix is carried out in molds. Conveniently, the molds used have at least one movable wall. It is also possible to use continuously operating shaping apparatus such as is employed for the continuous manufacture of molded bodies of particulate foamed plastics. Such apparatus consists for example of four conveyor belts arranged in a certain relationship to each other so as to form a channel. The mixtures of foamed particles and binder are fed to one end of this channel, in which they are compressed and conveyed to the other end of the channel, where the web of foamed plastics is discharged. The conveyor belts may also be in the form of plates joined together to form a chain. For the manufacture of broad webs, it is usually only necessary to use two conveyor belts extending parallel to each other and associated with fixed or moving walls at their sides such that the system forms a channel.

The compressed reaction mixtures are allowed to cure under pressure. The pressing time required may be adjusted within certain limits by selecting different binder mixes. Curing may be carried out at room temperature within several hours. It may be advantageous, however, to use an elevated temperature when curing the reaction mixture under pressure so as to obtain shorter pressing times, although the temperature may not exceed the crystalline melting point of the ethylene copolymers.

The molded articles made by the process of the invention, such as blocks and panels of various thicknesses, are soft and elastic and possess densities which vary, depending on the bulk density of the foamed ethylene copolymer particles used and on the amount of isocyanate group-containing binder mix, within wide limits. Usually the density of the molded articles which have been compressed to from 60 to 40% of their original bulk volume is from 30 to 60 g/l. Where the degree of compression is less, the density is correspondingly lower. It is also possible to effect compression of the reaction mixture to such a small extent that the resulting molded articles have voids through which, for example, liquids can flow.

The foamed molded articles of the invention have a variety of applications, frequently of the same kind as those of foamed articles of a different composition but possessing softness and flexibility. For example, they are suitable for use as panels to afford sound and heat insulation in buildings, as insulating materials for containers and as pipe insulating elements. They may be used as interlayers in compound assemblies. Of particular significance are foamed blocks or panels to which flexible layers, for example plastics films, leather, artificial leather and the like, have been laminated on one or more sides.

Since the foamed olefin polymers have closed cells, they are suitable for the manufacture of life-belts, floats, buoys or for filling cavities in watercraft. The foamed articles are also suitable as package fillings, particularly for cushioning delicate instruments or apparatus during storage or transport. The molded articles produced by the process of the invention may also be used as upholstery in furniture and vehicles. To this end, the molded articles used are conveniently such as possess foamed particles having particularly high resilience. The products may also be used in plant culture, for ground insulation purposes and as drainage layers.

In the following Examples the parts and percentages are by weight unless otherwise stated. Parts by weight relate to parts by volume as do kilograms to liters.

EXAMPLE 1

1,000,000 parts by volume of foamed ethylene copolymer particles containing polymerized units of acrylic acid (3.8%), t-butyl acrylate (8.4%) and ethylene (87.8%) and having an average particle size of approximately 5 to 7 mm, a melt index of 6.5 g/min and a bulk density of 11 g/l, are thoroughly mixed with a binder mix consisting of 2,500 parts of a reaction product of propylene glycol and propylene oxide having a molecular weight of approximately 2,500 and a hydroxy number of approximately 55, 800 parts of a mixture of 60 parts of diphenylmethane diisocyanate and 40 parts of an 80 : 20 mixture of 2,4- and 2,6-toluylene diisocyanate, 1,250 parts of castor oil and 6 parts of tin(II) dioctoate, for 5 minutes. The reaction mixture is poured into a mold and compressed to 40% of its original bulk volume. The mixture is held in the mold for 2 hours at 60°C and the resulting soft and elastic foamed article having a density of 42 g/l is then removed from the mold and cut into panels having a thickness of 15 mm using a commercial belt knife machine. The panels have a homogeneous appearance and are very flexible. The mold used may have a circular cross-section for example, as is usual in the manufacture of cylindrical foamed articles. Such foamed articles may, if desired, be rotated while a continuous foamed web having a thickness of 2 mm is sliced therefrom.

The molded articles are particularly suitable, for example, as cushioning material in vehicles.

EXAMPLE 2

1,100,000 parts by volume of foamed ethylene copolymer particles containing polymerized units of ethylene (70%) and vinyl acetate (30%), 80% of the acetoxy groups having been saponified after polymerization to form hydroxyl groups, and having an average particle size of approximately 12 mm, a melt index of from 3 to 4 g/min, a softening point of 89°C and a bulk density of 14 g/l are mixed with a binder mix consisting of 3,000 parts of an adipic acid/diethylene glycol polyester having an average molecular weight of approximately 3,100 and a hydroxyl number of approximately 40, 879 parts of an 80 : 20 mixture of 2,4- and 2,6-toluylene diisocyanates and 30 parts of tin(II) dioctoate in a mixer equipped with stirrer arms which rotate at a speed of 100 r.p.m., mixing being carried out for 50 minutes.

The reaction mixture is placed in a rectangular mold and compressed to 75% of its original bulk volume. The mixture is held in the mold for 16 hours at room temperature and the resulting molded article having a density of 29 g/l and exhibiting voids between the foamed ethylene copolymer particles, is removed from the mold. The foamed articles made in this manner are used in the form of panels having a thickness of from 10 to 5 mm, particularly as a drainage layer for plant culture instead of a gravel layer having from 5 to 10 times the thickness. The panels are also highly suitable as a bottom layer for greening, say, concreted areas.

EXAMPLE 3

A reaction mixture prepared as described in Example 2 is placed in a rectangular mold and compressed to 30% of its original bulk volume. It is held in the mold for 16 hours at room temperature, and the resulting homogeneous and void-free molded article having a density of 57 g/l is then removed from the mold. This molded material is suitable, for example, as a heat-insulating wall covering or as a sound-insulating layer included in partitions in buildings. The molded material may also be employed in the form of sheeting having a thickness of 1 mm for use as packing material instead of paper.

We claim:
1. A process for the manufacture of molded articles from
    A. a binder mix containing
        i. di- or polyisocyanates selected from the group consisting of hexamethylene diisocyanate, diphenylmethane-4,4'-, -2,4'-, or -2,2'-diisocyanate, naphthalene - 1,5-diisocyanate, benzene-1,4-diisocyanate, triphenylmethane-4,4', 4''-triisocyanate, polyphenyl-polymethylene-polyisocyanates, toluylene -2,4,6-triisocyanate, toluene -2,4- or -2,6-diisocyanate and the addition products obtained from 1 mole of trimethanolpropane and 3 moles of toluene diisocyanate,
        ii. an unbranched, branched-chain or partially branched polyol having a molecular weight ranging from 300 to 5,000 and hydroxy numbers of from 30 to 85 selected from the group consisting of polyetherols and polyesterols,
        iii. a catalyst and
        iiii. optionally auxiliaries selected from the group consisting of stabilizers, plasticizers, dyes, fillers and flame retardants, and
    B. foamed ethylene copolymer particles with predominantly closed cells containing approximately 50 to 99% by weight of polymerized units of ethylene in addition to polymerized units of other olefinically unsaturated monomers, which contain, in the molecule, substituents having Zerewitinoff-active hydrogen atoms and having a diameter of from 30 to 50 mm and a bulk density of from 5 to 200 g/l, by mixing components A and B, compressing the mixture in molds to from 80 to 20% of its original bulk volume and curing under pressure, wherein the foamed ethylene copolymers contain, attached to the polymer chain, substituents having Zerewitinoff-active hydrogen atoms selected from the group consisting of $-SO_3H$, $-SO_2NH_2$, $-NH-CONH_2$, $NHCONH-$, $-CO-NH-CO-$,

—CO—NH—SO$_2$, —NH$_2$, —OH, —COOH and —NHCOOR, wherein R is an unsubstituted or substituted alkyl radical of from 1 to 6 carbon atoms.

2. A process for the manufacture of molded articles as claimed in claim 1, wherein the foamed ethylene copolymers contain from 50 to 90% by weight of polymerized units of ethylene, based on the total weight.

3. A process for the manufacture of molded articles as claimed in claim 1, wherein the foamed ethylene copolymers contain, attached to the polymer chain, hydroxyl, amino and/or carboxyl groups.

4. A process for the manufacture of molded articles as claimed in claim 1, wherein the foamed ethylene copolymers have a gel content of from 5 to 75% by weight, based on the total weight.

* * * * *